Oct. 25, 1966   N. J. HUGHES   3,281,171

SELF-PIERCING PRONGED T NUT

Filed Dec. 3, 1963

Inventor:
Norman J. Hughes,
by Walter S. Jones
Atty.

United States Patent Office 3,281,171
Patented Oct. 25, 1966

3,281,171
SELF-PIERCING PRONGED T NUT
Norman J. Hughes, Melrose, Mass., assignor to United-Carr Incorporated, a corporation of Delaware
Filed Dec. 3, 1963, Ser. No. 327,630
1 Claim. (Cl. 287—189.36)

This invention relates generally to fastener members and in particular to fastener members having integral attaching means for affixing the fastener to metal supports of various thicknesses.

Heretofore in the art similar devices have been employed in conjunction with wood, cardboard, Masonite and other relatively soft supporting materials, particularly where the user has desired to attach a threaded fastener to a support wherein one side of the support later becomes unavailable. For example, the decking on a ship to which the user wishes to bolt additional equipment after the decking has been laid.

However, where such devices have been used in like circumstances with metal supports, for example, the body or flooring of an automobile or an aircraft, it has been necessary to either weld the fastener to the metal support or employ some other form of adhesive to complete the assembly.

Such methods have not only proved time-consuming, and therefore costly, but also unsatisfactory in that the attachment has been known to give way when subjected to shock or continuous vibration.

Thus a specific object of the invention is to provide a fastener member which may be secured to a metal support in a simple, inexpensive and highly efficient manner.

A further object is to provide a threaded fastener member having a self-piercing means for rapid and efficient attachment of the fastener to a metal support.

A still further object is to provide a novel and efficient attaching means whereby a metal fastener may be attached to a metal support which support becomes inaccessible from one side prior to final utilization of the fastener.

Figure 1:
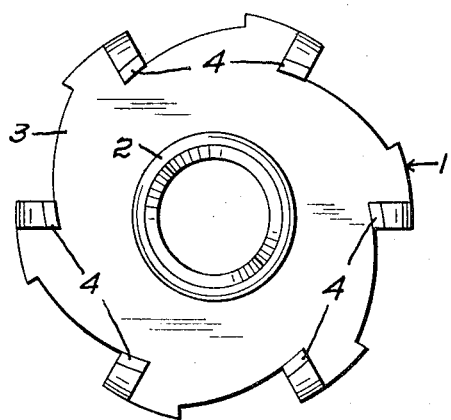
Figure 2:
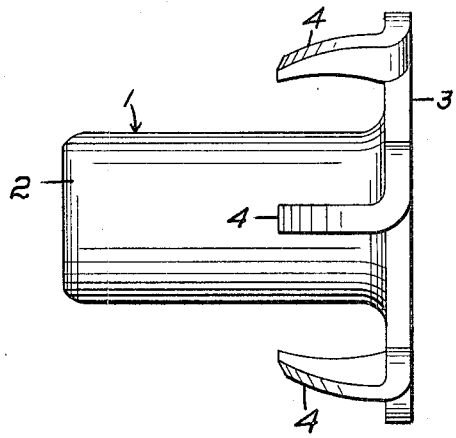
Figure 3:
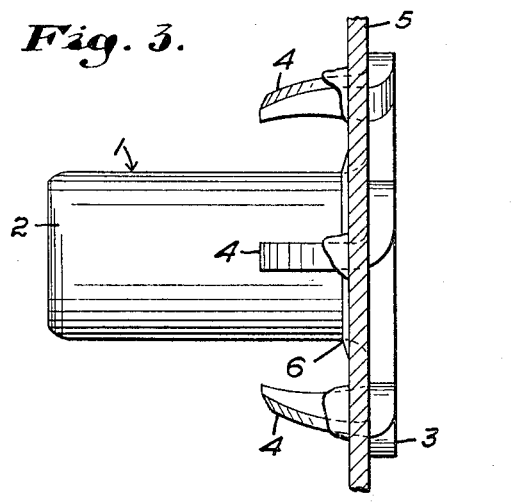
Figure 4:
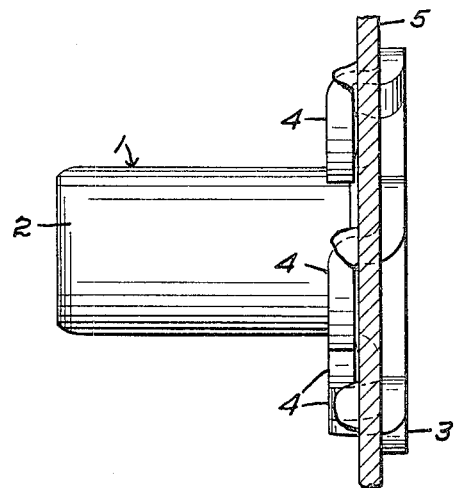
Figure 5:
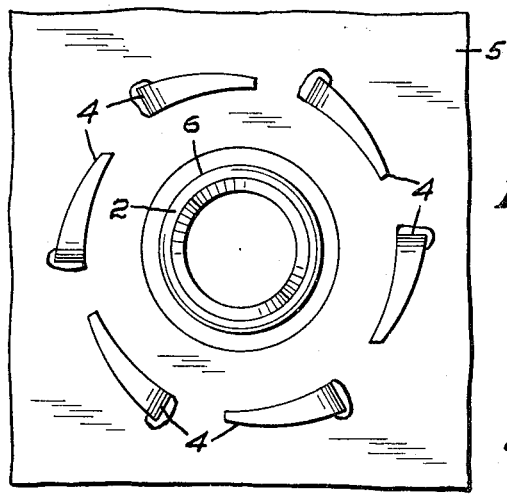

The invention will be more clearly understood from the following detailed description when read in conjunction with the accompanying drawings in which:

FIG. 1 is a top plan view of the fastener;
FIG. 2 is a side elevation of the fastener;
FIG. 3 is a side elevation showing the fastener attached to a metal support;
FIG. 4 is identical to FIG. 3 with the exception that the prongs have been bent over on a surface of the support; and
FIG. 5 is a top plan view of the installation shown in FIG. 4.

The invention has been shown in the form of a pronged nut as a convenient form of disclosure.

The nut 1 has a tubular threaded extension 2 and a flange 3 adjacent one end of the tubular extension. The flange 3 extends radially perpendicular from the outside of the tubular extension 2.

The tapered prongs 4 which are circumferentially disposed on the flange 3 have been formed by shearing portions of the periphery of the flange 3 and bending the sheared portions to extend parallel the tubular extension 2. Thus the prongs 4 form right angles at their jointure with the flange 3.

Due to the fact that the shear was begun at points adjacent the outer periphery of the flange 3 and was directed gradually inwardly towards said tubular extension 2, the prongs 4 as formed are tapered from their intersections with the flange towards their respective apices. As best shown in FIG. 2 the apex of each prong 4 is also slightly inclined towards the tubular extension 2.

FIGS. 3, 4, and 5 depict an installation of the fastener and a metal support which might represent a portion of the body of a motor vehicle or aircraft.

The metal support 5 is provided with a single aperture 6 for receiving the tubular extension 2.

In installation the tubular extension 2 is passed through the aperture 6 until the prongs 4 contact the surface of the metal support 5. A force is subsequently applied to the base of the flange 3 remote from said tubular extension 2, which force causes the prongs 4 to puncture the metal support 5. The prongs 4 grip the metal surrounding the punctures in claw-like fashion thereby securing the fastener 1 to the metal support 5.

In the assembly shown in FIG. 3 the claw-like gripping action of the prongs 4 provides considerable holding power resulting in a highly efficient attachment.

FIGS. 4 and 5 depict an installation wherein the prongs 4 have been subsequently bent over on a surface of the support 5 thereby rendering the possibility of the fastener 1 becoming dislodged negligible.

In the particular embodiment of the invention depicted in the drawings and described above the nut 1 has been drawn and formed from cold rolled steel and subsequently subjected to a carburizing process whereby increased hardness is imparted to the metal.

This hardening of the metal in particular the metal prongs 4 is highly significant in that the prongs when hardened will puncture steel and other metal stock of substantial thickness; for example, thickness utilized in the fabrication of automobile bodies. However, it is envisioned that alternative constructions of the novel fastener would also produce the desired results.

For example, testing has shown that if the fastener is initially drawn and formed from stainless steel the prongs will puncture substantial thicknesses of metal stock without the necessity of additional hardening.

Also the prongs themselves might be ribbed, embossed or workhandened to impart the necessary rigidity to them.

Further it is anticipated that the metal piercing prongs might be employed in conjunction with fasteners other than those embodying a threaded tubular extension. For example, an externally threaded stud might be attached to the pronged flange.

Thus with reference to the foregoing description it is to be understood that what has been disclosed therein represents a single embodiment of the invention and is to be construed as illustrative rather than restrictive or limiting in nature and that the scope of the invention is best described by the following claim.

I claim:

An assembly comprising in combination a metal support having an aperture and a nut attached to said support, said nut having a flange, a threaded tubular extension, capable of receiving a threaded bolt, seated in said aperture and a series of self-piercing prongs formed integral with the periphery of said flange, said prongs having been driven through said support adjacent said aperture such that said flange overlies and engages one surface of said support and said prongs having been bent over and engaged on a surface of said support remote from said flange to complete the assembly.

References Cited by the Examiner

UNITED STATES PATENTS

| | | | |
|---|---|---|---|
| 2,102,558 | 12/1937 | Johnson | 151—41.73 |
| 3,193,921 | 7/1965 | Kahn | 189—36 X |
| 3,208,135 | 9/1965 | Newbold et al. | 151—41.7 |

FOREIGN PATENTS

| | | |
|---|---|---|
| 535,380 | 2/1955 | Belgium. |
| 1,081,364 | 6/1954 | France. |
| 914,529 | 1/1963 | Great Britain. |

HARRISON R. MOSELEY, *Primary Examiner.*

P. M. CAUN, *Assistant Examiner.*